(12) United States Patent
Eigeles

(10) Patent No.: US 6,401,203 B1
(45) Date of Patent: Jun. 4, 2002

(54) METHOD FOR AUTOMATIC HANDLING OF CERTIFICATE AND KEY-BASED PROCESSES

(76) Inventor: Dan Eigeles, 47 Moshe Goshen Ave., Kiryat Motzkin 26313 (IL)

( * ) Notice: Subject to any disclaimer, the term of this patent is extended or adjusted under 35 U.S.C. 154(b) by 0 days.

(21) Appl. No.: 09/189,180

(22) Filed: Nov. 10, 1998

(30) Foreign Application Priority Data

Nov. 20, 1997  (IL) .................................................. 122254

(51) Int. Cl.⁷ .............................. H04L 9/32; H04L 9/12
(52) U.S. Cl. ..................... 713/156; 380/279; 380/280; 380/277; 713/171
(58) Field of Search .................... 380/30, 277, 278, 380/280, 279; 713/171, 156–158

(56) References Cited

U.S. PATENT DOCUMENTS

| | | | | |
|---|---|---|---|---|
| 5,164,988 A | * | 11/1992 | Matyas et al. | 380/25 |
| 5,778,072 A | * | 7/1998 | Samar | 380/30 |
| 6,192,131 B1 | * | 2/2001 | Greer, Jr. et al. | 380/283 |

\* cited by examiner

*Primary Examiner*—Gilberto Barrón, Jr.
*Assistant Examiner*—Justin T. Darrow
(74) *Attorney, Agent, or Firm*—Bromberg & Sunstein LLP

(57) ABSTRACT

A method, system and program for automatic administration and management of a plurality of certificates and/or cryptographic keys. Each key is associated with a set of attributes so that the set of attributes is specific both to a user or group of users and to a particular use to which the key is intended to be put. Each user can automatically conduct any legitimate operation or process related to any certificate/key and/or group of certificates/keys by virtue of the associated set of attributes.

10 Claims, 6 Drawing Sheets

IMPROVED_GENERIC_CERTIFICATE

- owner unique identifier
- BAV
- data (including but not limited to owner public key)
- issuer signature

A_GENERIC_CERTIFICATE

- owner unique identifier
- data (including but not limited to owner public key)
- issuer signature (Prior Art)

Figure 1

{ Others than Bob_UID }

.

.

Bob_UID
Data_1 of Bob_UID
Signature_1 for Bob_UID

Bob_UID
Data_2 of Bob_UID
Signature_2 for Bob_UID

.

.

.

Bob_UID
Data_k of Bob_UID
Signature_k for Bob_UID

.

.

.

Bob_UID
Data_n of Bob_UID
Signature_n for Bob_UID

.

.

{ Others than Bob_UID }

(Prior Art)

Figure 2

{ Others than Bob_UID }

.

.

Bob_UID
Data_1 of Bob_UID

Bob_UID
Data_2 of Bob_UID

.

.

.

Bob_UID
Data_k of Bob_UID

.

.

.

Bob_UID
Data_n of Bob_UID

.

.

{ Others than Bob_UID }

(Prior Art)

Figure 3

IMPROVED_GENERIC_CERTIFICATE

- owner unique identifier
- BAV
- data (including but not limited to owner public key)
- issuer signature

Figure 4

{ Others than Bob_ID }

.

.

.

Bob_UID
BAV_a
Data_1 of Bob_UID
Signature_1 for Bob_UID

Bob_UID
BAV_b
Data_2 of Bob_UID
Signature_2 for Bob_UID

.

.

.

Bob_UID
BAV_x
Data_k of Bob_UID
Signature_k for Bob_UID

.

.

.

Bob_UID
BAV_y
Data_n of Bob_UID
Signature_n for Bob_UID

.

.

{Others than Bob_UID }

Figure 5

{ Others than Bob_ID }

.

.

.

Bob_UID
BAV_a
Data_1 of Bob_UID

Bob_UID
BAV_b
Data_2 of Bob_UID

.

.

.

Bob_UID
BAV_x
Data_k of Bob_UID

.

.

.

Bob_UID
BAV_y
Data_n of Bob_UID

.

.

.

{Others than Bob_UID }

Figure 6

METHOD FOR AUTOMATIC HANDLING OF CERTIFICATE AND KEY-BASED PROCESSES

The present application claims priority from Israeli patent application number 122254, filed Nov. 20, 1997, which application is herein incorporated by reference.

TECHNICAL FIELD

The present invention relates to a system and method for automatically administering and managing a plurality of certificates or cryptographic keys, each associated with a set of attributes.

BACKGROUND OF THE INVENTION

The use of cryptography for purposes of data security is increasingly prevalent and critical to communication and commerce over networks that include computer communications networks, satellite data links, and PBX and ISDN telephony links of various kinds. Generally speaking, cryptography is based on cryptographic keys, which may be referred to herein as "C_Keys". In the description that follows, the term "enveloping" may be used to denote encryption, while the phrase "opening an envelope" may refer to decryption using a cryptographic key. Whenever one or more keys are stored (or otherwise available), there is a need for deciding, in each instance, what key is to be made available for a particular purpose. Thus, it might be desirable to make distinct keys available to distinct users, or, alternatively, to a distinct class of users for a specified purpose. The decision regarding which key, if any, is to be made available in a particular case is currently performed in a non-automated way.

Cryptographic keys may include both symmetric and asymmetric keys. Symmetric keys must always be kept only within a restricted group of users, because if a message is encrypted with a symmetric key K1 then anyone knowing K1 can decrypt that message.

For the case of asymmetric keys, at least one pair of keys is associated with each owner. One key of each pair of keys is private (known and kept only by its owner). The other key is public (i.e., it is distributed freely to the public). A message encrypted with one of the keys of the pair can be decrypted only with the other key in the pair. In addition, a message may be cryptographically signed with one of the keys in the pair and the second key in the pair may then be used to verify the authenticity of the specific message.

As used in the present description and in any appended claims, the terms "owner" and "user" are not restricted to humans but may equally encompass machines or programs, or, for that matter, multiple tasks and devices. In the following, the names "Alice" and "Bob" are used as examples.

For purposes of providing a concrete example of the use of asymmetric cryptography, it will be assumed that Alice intends to send to Bob some secure message.

- Bob must have a pair of keys and Alice must know Bob's public key;
- Alice must have a pair of keys and Bob must know Alice's public key;
- Alice will sign the message using Alice's private key and will envelope it using Bob's public key; and
- Bob will open the envelope using Bob's private key and will check Alice's signature using Alice's public key.

In order to accomplish the transmission described, Alice and Bob must exchange their respective public keys in such a way that each of them knows at a satisfactory level of confidence that the key received really belongs to the real user. This is referred to as an "authentication problem," and is addressed by authentication centers. Such a center—usually referred to as a Certificate Authority (CA)—delivers certificates by means of a Certificate Server (CS). A certificate confirms some linkage between data elements, which may include, without limitation, a name (or any other identifier) and a public key. Typical elements of a certificate are those depicted in the schematic representation of a prior art certificate shown in FIG. 1. It is assumed that the public key of some CA is well known. Hence if Alice asks for Bob's certificate and such a certificate has been released by a particular CA, referred to as CA_X, then Alice might check the validity of the certificate and its contents (including it's being related to Bob and usually holding Bob's public key) by using the public key of CA_X (which is assumed to be known to Alice directly or by other well-known tracing means).

For purposes of the present description, and in any appended claim, the term "cryptographic key" will, as a matter of definition, be understood to refer, as well, to certificates that contain keys. Similarly, the term "certificate" will refer, as well, to keys contained within them. Finally, again as a matter of definition, the term "certificate authority" will be understood to include one or more certificate servers, whether or not pertaining to a single certificate authority.

Some user might have a number of certificates. The certificates of a user might reside on one or more certificate servers. Reasons for maintaining multiple certificates per user include, for example, separating C_Keys at home from those used at the work place, so that access by an employer, for example, does not compromise the security of the documents not related to the workplace. Another reason might be that distinct applications may use different protocols with different cryptographic schemes or different forms of data representation.

Referring again to the hypothetical example, in light of a plurality of potentially available certificates, if Alice is interested in fetching Bob's certificate from the CS, and the CS has a number of certificates for Bob, then the CS might randomly offer to Alice one of them, all of them or none, unless Alice supplies a more precise definition that points uniquely to some specific certificate.

More particularly, Bob might have a unique identifier, referred to as Bob_UID, as well as a multiplicity of certificates located at some CS. The arrangement of stored certificates is shown schematically in FIG. 2. When Alice asks for Bob_UID, the CS has no means to know which certificate to deliver to Alice since Bob_UID points to all certificates owned by Bob.

Similarly, if Alice maintains public key counterparts of a multiplicity of keys belonging to Bob (referred to as Bob_1, Bob_2 ... Bob_N, each unique}, then Alice has to decide each time which one of Bob's public key to use in a particular situation. The storage of data including Bob's certificates in Alice's database is depicted schematically in FIG. 3, illustrating the ambiguity of a reference to Bob_UID. Furthermore, since Alice might wish to use a particular key of Bob's for a particular task and since there are a number of public keys in Alice's database, Alice is currently required to perform many individual non-automated steps.

Owing to the spreading prevalence of C_Key systems in the various contexts discussed above, and more particularly to the absence of well-defined relationships among technologies, protocols, certificates, etc., a method for automated C_key management and administration is desirable.

SUMMARY OF THE INVENTION

In accordance with a preferred embodiment of the present invention, there is provided a method for automatically administering and managing a plurality of certificates and/or cryptographic keys. Each key is associated with a set of attributes so that the set of attributes is specific to a particular use to which the key is intended to be put. Each user can automatically conduct any legitimate operation or process related to any certificate/key and/or group of certificates/keys by virtue of the associated set of attributes.

In accordance with an alternate embodiment of the invention, enabling the user to conduct a specified operation related to a specified cryptographic key is based at least on an association of the user and the specified operation with at least one of the set of attributes associated with the specified key. In accordance with further alternate embodiments of the invention, the plurality of cryptographic keys may be elements of an attribute vector. A set of attributes may be associated with each certificate and certificates may be selected and used on the basis of the sets of attributes.

In accordance with another aspect of the present invention, a method is provided for centrally administering and managing a plurality of certificates having contents, each certificate granted by a corresponding certificating authority. The central administration and management method has the steps of associating a set of attributes with each certificate, discerning among the certificates on the basis of the sets of attributes, and providing access to specified contents of a certificate on the basis of parameters supplied by the user, the parameters including an intended purpose supplied by the user for using the specified contents of the certificate.

BRIEF DESCRIPTION OF THE DRAWINGS

The invention will be more readily understood by reference to the following description, taken with the accompanying drawings, in which:

FIG. 1 is a block schematic of a prior art certificate;

FIG. 2 is a schematic showing how prior art certificates are stored by the CS;

FIG. 3 is a schematic representation of how data may be stored in the database of a prior art user;

FIG. 4 is a block schematic of a certificate in which a Block of Attributes Vector has been included in accordance with a preferred embodiment of the present invention;

FIG. 5 is a schematic representation of certificates stored in a CS in accordance with embodiments of the present invention; and FIG. 6 is a schematic representation of how data may be stored in a database with a BAV associated with particular public keys, in accordance with embodiments of the present invention.

DETAILED DESCRIPTION OF SPECIFIC EMBODIMENTS

The term "attribute," as used in the present description and in any claims appended hereto, refers to any parameter that may influence how and why to use a particular certificate and/or cryptographic key. The totality of attributes associated with a certificate or C_Key may be gathered in a vector herein referred to by the term "Attributes Vector" (AV).

In accordance with preferred embodiments of the present invention, a unique AV, serving as a well-defined qualifier, is attached to any certificate and/or to any C_Key, thus enabling automatic management and administration of certificates and C_Keys. Management refers to the determination of policy, for example with respect to criteria for granting, revoking, replacing a user certificate or certifying subordinated CA sites, etc. Administration refers to the implementation of such policy. The present invention is advantageously employed in both management and administration contexts, and the term "administration" is used herein, and in any appended claims, in an inclusive sense that incorporates management functions.

The use of an AV, in accordance with the present invention, may advantageously provide for deterministic routing of messages to devices or users in an efficient way. Implementation of such deterministic routing in either hardware or software, or in a combination of the two, will be referred to as a "router."

The use of an AV is independent of cryptographic technologies, which may include, within the scope of the present invention and without limitation, RSA algorithms, the Certicom ECC algorithm, Diffie-Hellman algorithms and any other. Delivery of certificates may be under any format, including, again without limitation, the formats of X.509 (and its versions), General Certificates (GC), Simple Public Key Infrastructure (SPKI) etc. Any protocol may be employed in practice of the present invention, including, by way of example, such protocols as MIME, S/MIME, HTTP, UDP, SMTP, SET, etc., such protocols referring to a part, or the whole, of a communication session.

Referring to FIG. 4, in accordance with embodiments of the present invention, a special data block is added to a certificate: the Block of Attributes Vector (BAV). The following types are examples of types that may be included as elements of the AV:

(a) Type of cryptography used for the certificate itself (RSA, ECC, etc.);

(b) Type of cryptography/algorithm to be used by the devices/process for the session (RSA, ECC, Diffie-Hellman, DES, Blowfish, etc.);

(c) Type of intended process user/peripheral device (terminal, phone, fax, smart card, etc.);

(d) Type of the intended certificate user (computer application, physical device, etc.);

(e) Type of the certificate owner entity (private person, CA, institute, etc.);

(f) Type of channel/protocol to be used (PBX, ISDN, TCP/IP, HTTP, SMTP, UDP, etc.);

(g) Type or purpose of session (control, data, etc.);

(h) Type of the certificate grantor (CS/CA level, authentication level, etc.);

(i) Type of physical location (home, office, vehicle, etc.);

(j) Type of logical location (global, cluster, site, disk, etc.); and (k) Types of auxiliary data for dedicated purposes (reserved for future use or applications).

Each type may assume different values, with these values corresponding to the "attributes" defined above.

As a particular example, provided without limitation, one type of data to which an AV parameter may correspond is that of bio-data. Bio-data may include such biological parameters such as finger print or palm characteristics, voice characteristics, retina characteristics, signature, scent, etc., any of which, alone or in combination, may serve to identify a person uniquely. A match to one or more corresponding parameters stored as an AV parameter may be required for authenticating that a sender corresponds to the individual specified by that parameter of the certificate.

Thus, a value may be associated with each element in the Attribute Vector linked to a particular certificate or C_Keys of a certain owner. These comprise the BAV added to each certificate, as shown in FIG. 4. A certificate including a BAV in accordance with the present invention may be referred to as an "improved certificate."

Referring now to FIG. 5, Bob is shown to have a unique identifier Bob_UID and a multiplicity of improved certificates located at some CS. Now, while Bob_UID points to all certificates owned by Bob, Bob may have a multiplicity of BAVs (indexed as BAV_k) each of which is unique. Thus, the conjunction of the UID and an instance of BAV is unique and points to only one certificate, intended to satisfy the requirements, described by the attributes, for one entity. The result is that if the CS is requested to deliver a certificate owned by Bob_UID having BAV_k, then there will be no more than one such a certificate; and, if such a certificate exists, it may be immediately delivered by the CS.

Referring to FIG. 6, once Alice receives any improved certificate, she can store the data she is interested in. Such data will typically contain Bob's public key and the relevant BAV linked to it. Now, any application pertinent to Alice may automatically access Bob's public keys in view of specified requirements for conducting tasks between Alice and Bob by virtue of the attributes, as reflected in the values set in the BAV.

Bob on his side, will receive some signaling or controlling data letting him know what BAV has been deployed to Alice. This defines to Bob which of his private key to use and which one of Alice's public key to use.

Furthermore, in accordance with an alternate embodiment of the present invention, if Alice decides to conduct some task for some BAV_u common to many Bobs, this can be easily done by simply fetching from Alice (or the CS) database all certificates or keys satisfying the values of BAV_u. And, in accordance with yet another alternate embodiment of the present invention, a subgroup of attributes, denoted bav, may belong to BAV. Such a subgroup may act as a logical filter for selecting or eliminating certificates from some intended use of certificate or keys.

In an alternative embodiment, the disclosed method for handling certificate and key-based processes may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In accordance with a further alternate embodiment of the present invention, the described method of attribute storage and certificate administration may be advantageously employed in a certificate clearinghouse or repository for handling certificates granted by any number of CAs. A user may request a certificate associated jointly with a specified owner, a specified certificating authority, and a specified intended purpose for using the certificate. Such a clearinghouse may additionally provide linkage or indexing between or among certificate serial numbers to the extent to which the serial numbers may change when a certificate is replaced.

The described embodiments of the invention are intended to be merely exemplary and numerous variations and modifications will be apparent to those skilled in the art. All such variations are intended to be within the scope of the present invention as defined in the appended claims.

I claim:

1. A method for administering and managing a plurality of cryptographic keys owned by at least one owner, the method comprising:
   a. associating a set of attributes with each cryptographic key;
   b. storing the plurality of cryptographic keys and their associated sets of attributes at a first site; and
   c. enabling a user including but not limited to the owner of a specified cryptographic key to access a subset of the set of attributes of the specified cryptographic key of the plurality of cryptographic keys and thereby conduct an operation related to the specified cryptographic key based at least on a requirement imposed by the owner on an association of the user with at least one of the set of attributes associated with the specified key.

2. A method in accordance with claim 1, wherein the plurality of cryptographic keys are elements of an attribute vector.

3. A method for administering and managing a plurality of cryptographic keys owned by at least one owner, the method comprising:
   a. associating a set of attributes with each cryptographic key; and
   b. enabling a user including but not limited to the at least one owner to conduct a specified operation related to a specified cryptographic key based at least on a requirement imposed by the at least one owner on an association of the user and the specified operation with at least one of the set of attributes associated with the specified key.

4. A method for administering and managing a plurality of certificates, each certificate pertaining to a specified owner, the method comprising:
   a. associating a set of attributes with each certificate; and
   b. providing a subset of the attributes of a certificate to a user including but not limited to the owner on the basis of characteristics of the user specified by the owner.

5. A method for administering and managing a plurality of cryptographic keys, each cryptographic key pertaining to a specified owner, the method comprising:

a. associating a set of attributes with each key; and b. providing a subset of the attributes of a certificate to a user including but not limited to the owner on the basis of characteristics of the user specified by the owner.

6. A method for enabling an owner of cryptographic keys to automatically use the proper keys for at least one of signing, enveloping, validating signatures, and decrypting data, for exchange of data with a particular second user, the method comprising:

a. associating a set of attributes with each key; and b. discerning among the keys on the basis of the sets of attributes and characteristics of the user specified by the owner.

7. A method for centrally administering and managing a plurality of certificates having contents, each certificate granted by a corresponding certificating authority, the method comprising:

a. associating a set of attributes with each certificate; and b. discerning among the certificates on the basis of the sets of attributes; and c. providing access to a subset of the attributes of a certificate to a user including but not limited to the owner on the basis of characteristics of the user specified by the owner and parameters supplied by the user, the parameters including an intended purpose supplied by the user for using the specified contents of the certificate.

8. A system for administering and managing a plurality of cryptographic keys, the system comprising:

a. a memory for storing a set of attributes associated with each cryptographic key; and b. a router for enabling a user including but not limited to the owner of a specified cryptographic key to conduct an operation related to the specified cryptographic key based at least on a particularized association of the user with at least one of the set of attributes associated with the specified key.

9. A computer program product for administering and managing a plurality of cryptographic keys, each cryptographic key associated with an owner, the computer program product comprising a computer usable medium having computer readable program code thereon, the computer readable program code including:

a. program code for associating a set of attributes with each cryptographic key; and b. a router for enabling at least one user including but not limited to the owner of a specified cryptographic key to conduct an operation related to a specified cryptographic key based at least on an association of the at least one user with at least one of the set of attributes associated with the specified key.

10. A certificate clearinghouse for administering and managing a plurality of certificates, the certificates granted by a plurality of certificating authorities, the certificate clearing house comprising:

a. a memory for storing a set of attributes associated with each certificate; and b. a router for enabling a user to conduct an operation related to a specified certificate of which the user is not an owner based at least on an association of the user with at least one of the set of attributes associated with the specified certificate.

* * * * *